April 15, 1941.                    J. MIHALYI                    2,238,498
FOCUSING LENS MOUNT FOR CAMERAS
Filed Oct. 11, 1939
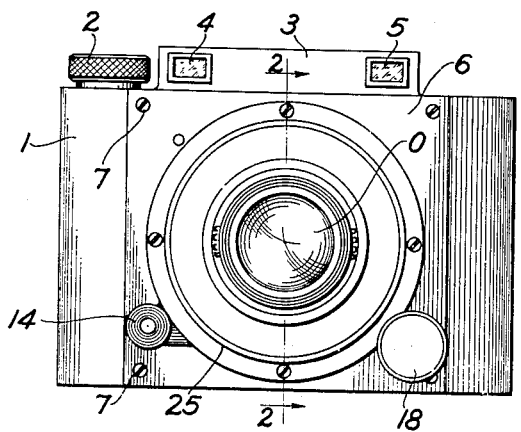
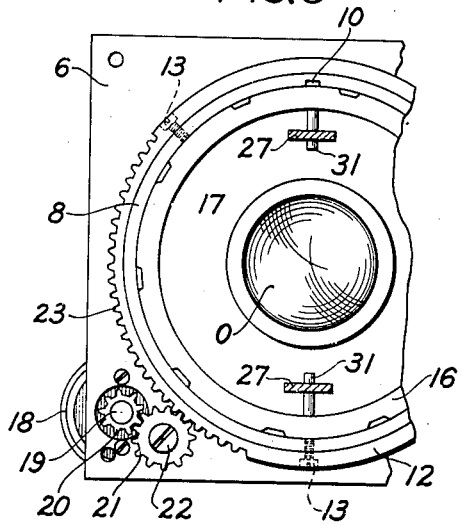
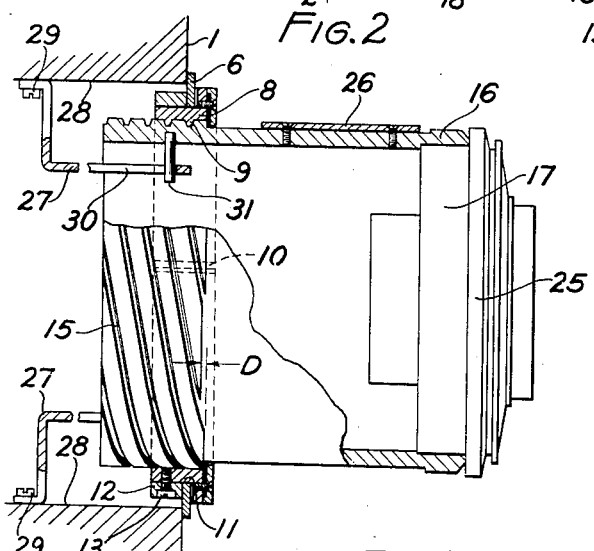
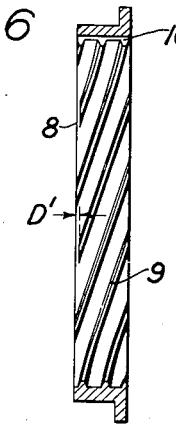
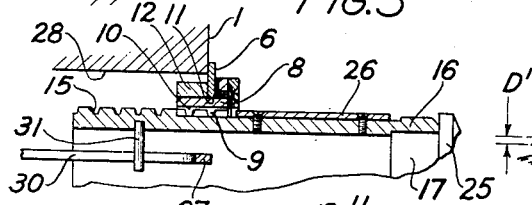
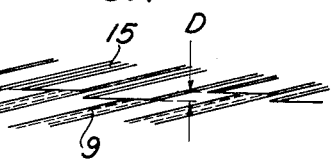
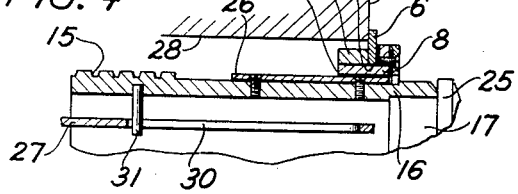
JOSEPH MIHALYI
INVENTOR
BY
ATTORNEYS Patented Apr. 15, 1941

2,238,498

UNITED STATES PATENT OFFICE 2,238,498

FOCUSING LENS MOUNT FOR CAMERAS

Joseph Mihalyi, Rochester, N. Y., assignor to Eastman Kodak Company, Rochester, N. Y., a corporation of New Jersey Application October 11, 1939, Serial No. 298,951

13 Claims. (Cl. 95—45)

This invention relates to photography and more particularly to focusing lens mounts for photographic cameras. One object of my invention is to provide a structure of the class described in which the objective may be quickly brought into a focusing position. Another object of my invention is to provide a mechanism for quickly bringing the objective into a focusing position and for accurately adjusting the objective to any selected focal distance after having been quickly positioned at the infinity position. Another object of my invention is to provide an objective mount in which the greater part of the movement to position the lens is a sliding movement after which a spiral movement of the objective is used for focusing on various different focal distances. Still another object of my invention is to provide a pair of mating thread members which may be quickly and accurately mated by a slight rotative movement of the mount. A still further object of my invention is to provide mating threads with angular ends or teeth some of which extend axially of others so that they will immediately mesh when a lens tube is drawn out to a proper position and other objects will appear from the following specification the novel features being pointed out in the claims at the end thereof.

Coming now to the drawing wherein like reference characters denote like parts throughout, Fig. 1 is a front plan view of a camera constructed in accordance with and embodying a preferred form of my invention.

Fig. 2 is a fragmentary enlarged part section and part elevation taken on line 2—2 of Fig. 1.

Fig. 3 is a fragmentary detail section showing the relationship of the lens tube and focusing mount structure when the lens tube has been drawn out to substantially an infinity position.

Fig. 4 is a view similar to Fig. 3 but with the parts in a collapsed or folded position.

Fig. 5 is a fragmentary plan taken from the back of the camera and showing the connection of the focusing knob with an adjusting ring.

Fig. 6 is an enlarged sectional view of a focusing ring which is mounted on the front wall of the camera, and Fig. 7 is a diagrammatic view showing the relationship of mating threads on the focusing ring and tubular lens mount.

In cameras and particularly in compact cameras of the so-called "miniature" type, a camera objective is frequently mounted on a tubular support the tubular support being in turn carried by the camera body. My invention relates to such cameras and particularly to a method of collapsing the camera into a compact or folded position and to a structure for quickly opening the camera into a picture taking position.

In accordance with a preferred embodiment of my invention, the camera may comprise a camera body 1 on which there may be mounted a film winding key 2 and a housing 3 which may contain range finder elements 4 and 5. The front wall of the camera is preferably covered by a metal plate 6 which may be attached to the camera body by screws 7 this metal plate supporting an annular thread member 8 which carries multiple internal threads 9 and which is provided with at least one axial slot 10.

The annular thread member 8 is mounted in a circular opening 11 in the plate 6 and may freely turn since there is a collar 12 attached to the ring by means of one or more screws 13 this collar being so adjusted that free rotative movement of the annular thread member may take place when a handle 14, which is carried by the annular thread member, is turned. However, this turning movement can only occur when the threads 9 are mating with threads 15 carried by the tubular extension 16 which will be hereinafter more fully described.

In the present embodiment of my invention an operator may, as above described, use the handle 14 for fine adjustment of the objective O carried in a shutter 17 to adjust the objective for various focal positions or a second focusing member may be used. This member consists of a knob 18 pivotally mounted on the plate 6 and being carried by a shaft 19 on which a gear 20 is carried so that this gear, by meshing with a gear 21 mounted to turn on a stud 22, may turn the gear segment 23 which is here shown as forming a part of the collar 12 which includes the thread 9 engaging the tubular extension 16. The thread 8 may slidably engage the smooth exterior wall of extension 16 or may engage the thread 9 thereof. Thus either the knob 18 or the handle 14 may be turned to adjust the objective to various focal positions.

If the camera is in a collapsed or folded position, in order to take pictures, the ring 25 surrounding the shutter 17 which can be conveniently knurled, is drawn axially of the objective. This movement causes the tubular extension 16 to move outwardly and, since the tubular extension is provided with a web 26, and this web extends axially of the tubular extension, the web slides in the groove 10. As long as web 26 lies in the groove 10, the handle 14 cannot turn, since the web 26 is carried by the tube 16 which cannot turn due to the pin 31 and the guideway 30. Thus, as long as any part of the web 26 lies in the groove 10, the annular thread member 9, together with the operating handle 14 and the focusing knob 18, are all held against movement. However, as soon as the tubular extension 16 is drawn out until the web leaves the slot 10, as shown in Fig. 3, it is possible to focus the objective by either the handle 14 or the knob 18 because rotative movement is permitted. I find it convenient to draw out the tubular extension to a distance sufficient to bring the objective to or substantially to an infinity position so that movement from this point outwardly will cause the objective to focus on objects which are closer to the camera.

The tubular extension 16 can never turn with respect to the camera body 1 because the camera body carries a pair of brackets 27 attached to the walls 28 of the camera body by means of screws 29. These brackets are slotted at 30 to receive pins 31 extending inwardly on the tubular extension so that only movement axially of the objective is permitted.

When parts are drawn to the position shown in Fig. 3 in which the web 26 has passed through the slot 10, it is desirable to immediately mesh the mating screw threads 9 and 15. Normally if all of the mating threads were cut off at right angles to the axis of the objective, it would be difficult to bring the threaded members into mesh. However, I have overcome this difficulty by cutting off various threads of the mating threads 9 and 15 at different points axially of the objective so that certain threads project longitudinally with respect to certain other threads so that even a slight turning movement of the annular thread member 9 will immediately mesh the threads.

It will be noted from Fig. 2 that every other thread 15 is cut off a distance D shorter than the other threads so that each alternate thread projects outwardly from its next adjacent thread. Similarly, from Fig. 6 it will be noticed that the annular thread member 8 is provided with threads some of which extend to the end wall of the ring whereas others extend only a distance D' to the edge of the ring and thus project axially of the other threads. The reason for this is as follows: since the tubular extension 16 is drawn to the Fig. 3 position, the first slight turning movement causes the outwardly projecting thread ends, which I prefer to call teeth, of one threaded element to enter the mating corresponding threads of the other threaded element so that a proper meshing is immediately obtained. In fact it is impossible with this construction to turn one thread member relative to the other without meshing the threads during this turning movement.

It will be obvious that in order to secure this result it is only necessary to provide one or more pairs of mating threads 9 and 15 with short and long teeth and it is not necessary to provide every other thread with a tooth which projects axially of its next adjacent one. However, I find this a convenient construction and have so illustrated the quick mating threads in the preferred embodiment of my invention.

The operation of my quick focusing camera is exceedingly simple and can be accomplished in much less time than it takes to describe it. Assuming that the camera parts are in the folded position shown in Fig. 4 and it is desired to take a picture; the flange 25 is grasped by the operator who draws the tubular extension 16 outwardly. During this outward movement, since the web 26 slides in the slot 10, turning movement of the annular thread member 8 is prevented until the parts reach the position shown in Fig. 3. I find it convenient to have this position a position in which the objective is adjusted to focus on objects at 100 feet (in the case of relatively short focal length objectives). The tubular extension automatically comes to a stop at this position because the ends or teeth of the mating threads 9 and 15 reach a mating position and stop further sliding movement of the tubular extension 16.

Should the operator desire to focus on objects closer than 100 feet, he may then move either the handle 14 or the knob 18. By so doing, movement is transmitted to the annular thread member 8 and the projecting teeth of the mating threads 9 and 15 immediately engage and, by sliding one on the other, transmit focusing movement to the tubular extension 16. This focusing movement is smooth and easy and can be accurately accomplished because of the angle of the mating threads 9 and 15. If the camera objective is of a very short focal length, it is desirable to have the pitch of these threads quite slight so that a relatively large angular movement of the annular thread member will cause comparatively little axial movement. On the other hand, if this focusing structure is applied to an objective having a long focal length, the pitch of the threads can be greatly increased because considerably more movement of the objective for focusing on objects from 100 feet to 3 feet, for instance, will be required.

When the object has been focused and a picture has been taken, if the camera is to be folded, the natural way of accomplishing the folding movement is to swing the knob 14 until the parts are returned to the position shown in Fig. 3 in which position the slot 10 is automatically aligned with the web 26. In this position, as indicated in Fig. 3, it is only necessary to thrust inwardly upon the tubular extension causing the parts to move to their fully collapsed position in Fig. 4. As soon as the web enters the slot 10, the annular threaded member can no longer be turned so that both the handle 14 and the knob 18 are definitely latched in their inoperative position and will remain so latched until the parts are again moved to the erect or picture taking position as above described.

With the usual type of threads, whether the threads be single or multiple it is difficult to cause the threads to mesh, because the flat edges of two threaded areas may turn without the threads being actually brought into mesh. However, with my improved threads, in which certain threads project axially of the others, the first turning movement will cause the projecting threads to immediately mesh, and when so meshed, the objective may be focused by turning either the handle 14 or the focusing knob 18.

I claim:

1. In a focusing lens mount for cameras, the combination with a support, of an annular threaded member revolubly carried thereby including internal threads, an objective, an objective carrier comprising a tubular extension slidably mounted in the threaded member and including threads adapted to mesh with the threads of the annular member, means for sliding the tubular extension until the threaded areas of the tubular extension and annular member lie adjacent and means for causing the threaded areas to mesh rapidly comprising teeth in the two sets of threads projecting axially from other threads whereby turning movement of the tubular extension relative to the annular threaded member may mesh the threaded areas.

2. In a focusing lens mount for cameras, the combination with a support, of an annular threaded member revolubly carried thereby including internal threads, an objective, an objective carrier comprising a tubular extension slidably mounted in the threaded member and including threads adapted to mesh with the threads of the annular member, means for sliding the tubular extension until the threaded areas of the tubular extension and annular member lie adjacent, and means for causing the threaded areas to mesh rapidly comprising teeth on the ends of certain threads of each threaded area extending axially beyond other teeth forming the ends of certain other threads whereby the teeth may lie in staggered relation to be meshed by rotative movement of one threaded member relative to the other.

3. In a focusing lens mount for cameras, the combination with a support, of an annular threaded member revolubly carried thereby including internal threads, an objective, an objective carrier comprising a tubular extension slidably mounted in the threaded member and including threads adapted to mesh with the threads of the annular member, means for sliding the tubular extension until the threaded areas of the tubular extension and annular member lie adjacent, and means for causing the threaded areas to mesh rapidly comprising teeth on the ends of the threads of the threaded members, each alternate tooth extending axially of the next adjacent tooth whereby rotative movement of one threaded member relative to the other may mesh the gears through the interengaging teeth and the tubular extension may move axially relative to the support.

4. In a focusing lens mount for cameras, the combination with a support, of an annular threaded member revolubly carried thereby including internal threads, an objective, an objective carrier comprising a tubular extension slidably mounted in the threaded member and including threads adapted to mesh with the threads of the annular member, means for sliding the tubular extension until the threaded areas of the tubular extension and annular member lie adjacent, and means for causing the threaded areas to mesh rapidly comprising teeth on the ends of the threads of the threaded members, each alternate tooth extending axially of the next adjacent tooth whereby rotative movement of one threaded member relative to the other may mesh the gears through the interengaging teeth and the tubular extension may move axially relative to the support, and a pin and a slotted two-part guideway, the tubular extension carrying one part and the support carrying the other part whereby the movement of the tubular extension relative to the annular member may be guided to prevent turning.

5. In a focusing lens mount for cameras, the combination with a support, of a threaded member revolubly carried thereby, a tubular extension having a threaded area thereon and carrying an objective, a pin and a slotted guideway carried by the tubular extension and support for guiding the tubular extension to slide axially of the mount until the threaded areas of the support and tubular extensions approach each other, an objective carried by the tubular extension, and means for immediately meshing said threaded area comprising a number of threads on each threaded area of slightly greater length than other of the threads on each threaded area whereby the threads may be quickly meshed and rotative movement of the threaded member carried by the mount may focus said objective carried by the tubular extension.

6. In a focusing lens mount for cameras, the combination with a support, of a threaded member revolubly carried thereby, the top of threads having flat surfaces forming a cylindrical slideway, a tubular extension having a threaded area thereon and carrying an objective and of a diameter to slide in the slideway formed by the flat top of the threads, a pin and a slotted two-part guide, said tubular extension carrying one part and said support carrying the other part for guiding the tubular extension to slide axially of the mount until the threaded areas of the support and tubular extensions approach each other, an objective carried by the tubular extension, and means for immediately meshing said threaded areas comprising a number of threads on each threaded area of slightly greater length than other of the threads on each threaded area whereby rotative movement of the threaded member carried by the mount may focus said objective carried by the tubular extension.

7. In a focusing lens mount for cameras, the combination with an apertured support, of a threaded member revolubly carried thereby, a tubular extension having a threaded area thereon and carrying an objective, a pin and a slotted two-part guideway, said tubular extension carrying one part and said support carrying the other part for guiding the tubular extension to slide axially of the mount until the threaded areas of the support and tubular extensions approach each other, an objective carried by the tubular extension, and means for immediately meshing said threaded areas comprising teeth on the ends of the threads of the threaded members comprising angular edges of the threads, certain of the teeth projecting axially of certain of the other teeth to form projections engageable by moving the tubular extension relative to the annular threaded member whereby movement of the latter may move the former axially of the apertured support to focus the objective.

8. In a focusing lens mount for cameras, the combination with a support, of an annular threaded member revolubly carried thereby including internal threads, an objective, an objective carrier comprising a tubular extension slidably mounted in the threaded member and including threads adapted to mesh with the threads of the annular member, means for sliding the tubular extension until the threaded areas of the tubular extension and annular member lie adjacent, means for causing the threaded areas to mesh rapidly through a turning movement of one threaded area relative to the other, and means carried by the support and tubular extension for preventing a turning movement of the tubular extension, a second means carried by the tubular extension and annular threaded member for preventing the latter from turning until the threaded areas are substantially in meshing position.

9. In a focusing lens mount for cameras, the combination with a support, of an annular threaded member revolubly carried thereby including internal threads, an objective, an objective carrier comprising a tubular extension slidably mounted in the threaded member and including threads adapted to mesh with the threads of the annular member, means for sliding the tubular extension until the threaded areas of the tubular extension and annular member lie adjacent, means for causing the threaded areas to mesh rapidly through a turning movement of one threaded area relative to the other, means carried by the support and tubular extension for preventing a turning movement of the tubular extension, a second means carried by the tubular extension and annular threaded member for preventing the latter from turning until the threaded areas are substantially in meshing position, said first named means comprising a pin and a slotted guideway on the support and tubular extension for guiding the latter on the former.

10. In a focusing lens mount for cameras, the combination with a support, of an annular threaded member revolubly carried thereby including internal threads, an objective, an objective carrier comprising a tubular extension slidably mounted in the threaded member and including threads adapted to mesh with the threads of the annular member, means for sliding the tubular extension until the threaded areas of the tubular extension and annular member lie adjacent, means for causing the threaded areas to mesh rapidly through a turning movement of one threaded area relative to the other, means carried by the support and tubular extension for preventing a turning movement of the tubular extension, a second means carried by the tubular extension and annular threaded member for preventing the latter from turning until the threaded areas are substantially in meshing position, said first named means comprising a pin and a slotted guideway carried by the support and tubular extension for guiding the latter on the former, the slot in the annular threaded member releasing said web when said threaded areas are in a substantially meshing position.

11. A focusing lens mount for cameras comprising in combination, an objective, a tubular extension carrying said objective, an annular threaded ring rotatably mounted on the camera and supporting the tubular extension, said tubular extension including two portions, a smooth exterior surface on one portion and a threaded exterior on the other portion adapted to mesh with the threaded ring, means for preventing rotation of the tubular extension relative to the camera, and a second means for preventing rotation of the annular threaded ring only when the smooth exterior surface portion of said annular member is in a predetermined position in which the smooth exterior portion contacts with the threads of the threaded ring, said second means being releasable by sliding said tubular extension until said threaded portion of the tubular extension is moved adjacent the threaded annular ring.

12. A focusing lens mount for cameras comprising in combination, an objective, a tubular extension carrying said objective, an annular threaded ring rotatably mounted on the camera and supporting the tubular extension, said tubular extension including two portions, a smooth exterior surface on one of said portions and a threaded exterior on the other of said portions adapted to mesh with the threaded ring, means for preventing rotation of the tubular extension relative to the camera, and a second means for preventing rotation of the annular threaded ring only when the smooth exterior surface portion of the annular member is in contact with the threads of the annular threaded ring, said second means comprising a web extending axially over a portion of the smooth exterior surface portion of the tubular extension, and a slotted guideway cut in the threads of the annular threaded member, the proportions of the web and guideway being such that said annular threaded ring may turn when the threaded portion of said tubular extension lies adjacent to the threads of the annular threaded ring.

13. A focusing lens mount for cameras comprising in combination, an objective, a tubular extension carrying said objective, an annular threaded ring rotatably mounted on the camera and supporting the tubular extension, said tubular extension including two portions, a smooth exterior surface on one of said portions and a threaded exterior on the other of said portions adapted to mesh with the threaded ring, means for preventing rotation of the tubular extension relative to the camera, and a second means for preventing rotation of the annular threaded ring only when the smooth exterior surface portion of said annular member is in contact with the threads of the annular threaded ring, said second means comprising a web and slot connection between the annular threaded ring and the tubular extension, the web and slot being so positioned on the smooth exterior surface of the tubular extension and on the annular threaded ring that said parts may be disengaged when the threaded area of the tubular extension lies adjacent the thread of the annular threaded ring, whereby movement of said ring may, through engagement of said threaded portion of the tubular extension, move the latter for focusing the camera lens.

JOSEPH MIHALYI.